A. A. KAUL.
MOTOR CYCLE SUPPORT.
APPLICATION FILED NOV. 1, 1915.

1,200,622.

Patented Oct. 10, 1916.

UNITED STATES PATENT OFFICE.

ARTHUR A. KAUL, OF MILWAUKEE, WISCONSIN.

MOTOR-CYCLE SUPPORT.

1,200,622.    Specification of Letters Patent.    Patented Oct. 10, 1916.

Application filed November 1, 1915. Serial No. 59,057.

*To all whom it may concern:*

Be it known that I, ARTHUR A. KAUL, a citizen of the United States, and resident of Milwaukee, in the county of Milwaukee and State of Wisconsin, have invented certain new and useful Improvements in Motor-Cycle Supports; and I do hereby declare that the following is a full, clear, and exact description thereof.

The present invention is directed to new and useful improvements in supports for motorcycles and bicycles and is particularly directed to the provision of a support including a ground engaging wheel whereby the support may be actuated while the bicycle or motorcycle is in motion.

It is primarily the object of the invention to simplify the construction and improve the efficiency of devices of this character and it is more particularly an object to provide such a support which may be secured to various types of cycle structures.

A further object is to provide such a support which may be readily operated from a point forwardly of and adjacent the rider's seat whereby a most convenient manipulation is assured.

With the above and other objects and advantages in view, the invention resides more particularly in the novel combination, arrangement and formation of parts more particularly hereinafter described and particularly pointed out in the appended claims.

Reference is had to the accompanying drawings wherein similar characters of reference designate corresponding parts throughout the several views and in which—

Figure 1:
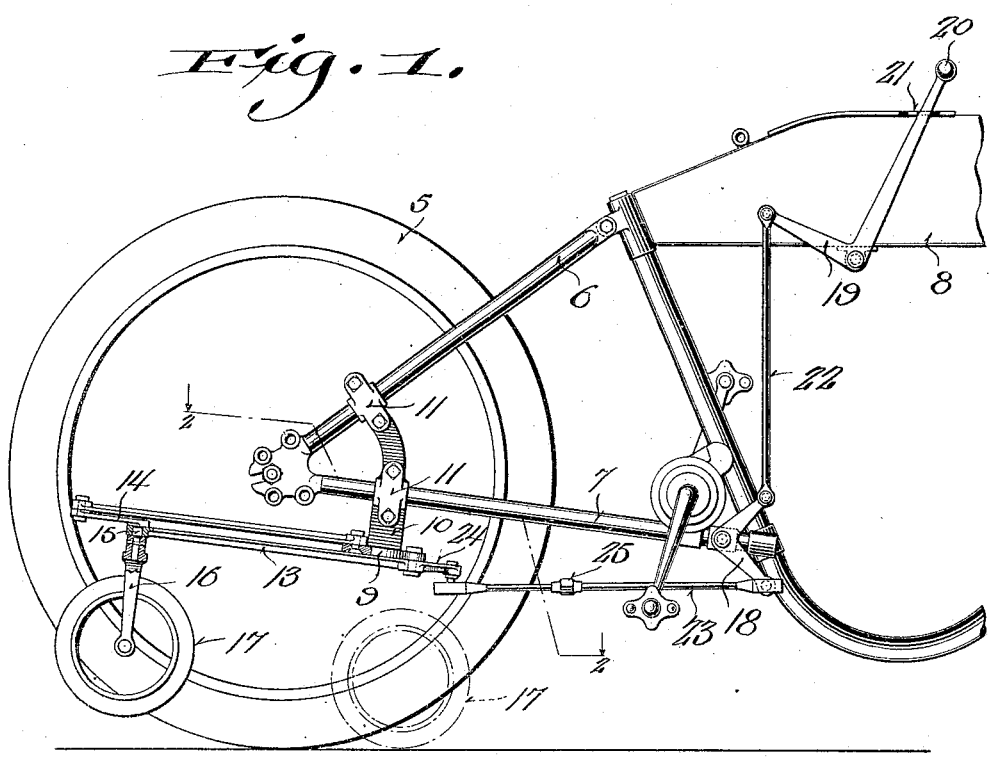
Figure 2:
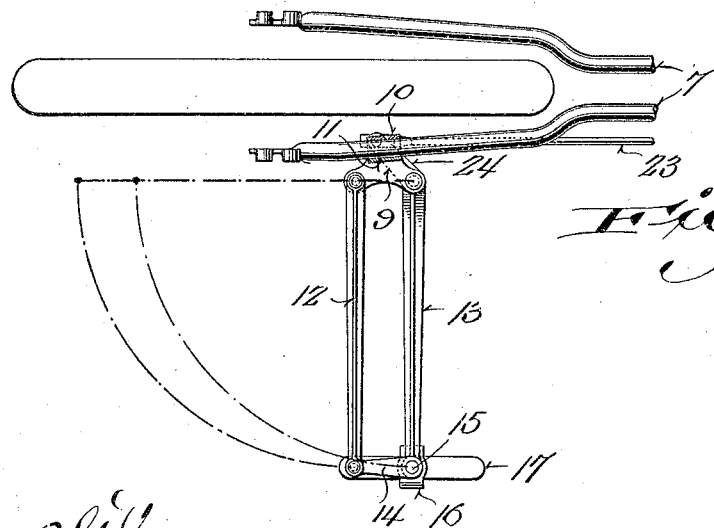

Figure 1 is a side elevation of the rear portion of a motorcycle structure having the improved support associated therewith and showing the support in inoperative position. Fig. 2 is a horizontal sectional view taken on the line 2—2 of Fig. 1, but showing the support swung outwardly to operative position.

Referring now more particularly to the accompanying drawings, there is shown a motorcycle structure including the rear wheel 5, the upper and lower fork members 6 and 7 respectively which carry the wheel, and the horizontal upper frame structure 8. The improved support comprises a pivot bracket 9 which is secured to adjacent sides of the rear forks by a hanger arm 10, which is intermediately bent to traverse the fork portions at right angles thereto to facilitate the application of suitable clamping means 11, such clamping means being not shown in detail, as any means for clamping or securing the hanger arm could be provided. As the lower fork 7 is inclined upwardly from its attachment to the frame, it is noted that the bracket plate 9 is also inclined whereby the wheel structure pivoted to said plate when swung in the plane thereof will move the wheel vertically into and away from engagement with the ground in swinging from an operative position to an inoperative or restricted position. This wheel carrying structure comprises a link 12 which is pivoted on the top face of the rear portion of the plate, and a link 13 which is pivoted at the under face of the front portion of the plate 9. A link 14 connects the free ends of these links 12 and 13 and has at one end a depending pintle 15 pivotally passed through the end of the link 13 and fixedly engaged in the head of a yoke 16, carrying the supporting wheel 17, the other end of the link 14 being pivoted at the under face of the end of the link 12. The links 12, 13, and 14 and plate 9 thus form a parallelogram so that in whichever relative position they are disposed the wheel 17 by its rigid connection with the link 14 is also maintained in a plane parallel to the plane of the rear wheel of the cycle structure, and the links and plate are so relatively connected that they may swing to a position wherein all of the pivots are alined. This feature enables the support to occupy a minimum amount of space along the rear wheel of the motorcycle when the support is in inoperative position.

For actuating the support in its various positions, from a point forwardly of and adjacent of the rider's seat, an angle lever 18 is pivotally mounted adjacent the inner end of the fork 7 and an angle lever 19 is pivotally carried at the intermediate portion of the upper frame structure 8, one arm of this lever being extended thereabove and headed to provide a handle 20 coacting by its resiliency with a notch plate 21 carried by the structure 8 to hold the lever in a desired position. A link 22 connects the other arm of the lever 19 with an arm of the lever 18 and a link 23 connects the other arm of the lever 18 with an arm 24 carried by the inner end of the link 13, this arm extending at an obtuse angle from said link in such direction that when the lever handle 20 is pulled rearwardly the support will be swung to operative position. The link 23 preferably comprises sections connected by a turnbuckle 25 whereby it is extensible to adjust the device for application to various types of cycle structures.

The support thus comprises an exceedingly simple structure which may be readily attached to various types of bicycles or motorcycles and may be rendered operative while the vehicle is in motion and thus may serve as an emergency means for preserving balance. As an instance of the use of the support in this connection, a motorcycle often runs into a wagon rut in a road, and in addition to it being impossible to get out of the rut without stopping the motorcycle, the matter of retaining the balance of the machine is very precarious. With the use of the improved support balance would be assured, and the rider could be enabled to drive the machine out of the rut without stopping the motorcycle.

I claim:

1. A support for cycle structures comprising a bracket plate adapted for attachment to the rear fork portion thereof, a link pivoted on the top face of the rear portion of the plate, a second link pivoted on the bottom face of the front portion of the plate, a third link pivoted to the outer end of the first link, a depending pintle rigidly connected to the third link and passed through the outer end of the second link, a wheel member rigidly secured to the pintle, and means for swinging the second link.

2. The combination with a cycle structure of a support therefor comprising an attaching member, connected with the vehicle structure adjacent the rear wheel, a wheel member pivoted to the attaching member and adapted to swing outwardly therefrom, an angle lever pivoted to the cycle structure adjacent the pedal portion thereof, a second angle lever pivoted to the cover portion of a cycle structure forwardly of the seat and including an upwardly extending arm, a link connecting the other arm of said second lever and one arm of the first lever and a link connecting the other arm of the first lever and the said wheel member.

In testimony that I claim the foregoing I have hereunto set my hand at Milwaukee, in the county of Milwaukee and State of Wisconsin, in the presence of a witness.

ARTHUR A. KAUL.

Witness:
M. E. DOWNEY.